United States Patent Office 3,344,207
Patented Sept. 26, 1967

3,344,207
STABILIZED VINYL CHLORIDE POLYMER COMPOSITIONS
Peter Francis Radice, King of Prussia, Pa., assignor to Pennsalt Chemicals Corporation, Philadelphia, Pa., a corporation of Pennsylvania
No Drawing. Filed Dec. 3, 1965, Ser. No. 511,313
6 Claims. (Cl. 260—897)

ABSTRACT OF THE DISCLOSURE

A stabilized vinyl chloride polymer composition is provided by mixing with vinyl chloride polymer an effective amount, generally within the range of from about 0.1 to about 5% by weight of the vinyl chloride polymer, of a chromium phosphinate polymer composed of the repeating unit

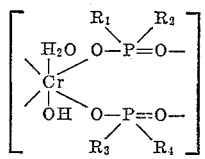

where $R_1$, $R_2$ $R_3$ and $R_4$ are organic groups which may be the same or different, such as alkyl, aryl, aryloxy and alkoxy having up to about 10 carbon atoms. The vinyl chloride polymer is thus rendered resistant to the degradative effects of ultraviolet radiation and heat.

---

This invention relates to stabilized vinyl chloride polymer compositions. More particularly, this invention concerns polymer compositions that have good resistance to the degradative effects of ultraviolet radiation and heat which comprise a blend of vinyl chloride polymer and an effective stabilizing amount of an inorganic polymer composed of repeating units of hydroxy aquo chromium phosphinates.

Because of the ever increasing emphasis on the use of vinyl chloride polymers as materials of construction in applications where the resin composition is exposed to the deteriorating effects of the sun, there is a need for stabilizing materials which inhibit the tendency of the vinyl chloride resin to discolor, crack, and become embrittled by said exposure to ultraviolet light and heat. It has now been discovered that such stabilization is accomplished by incorporating in the vinyl chloride polymer an effective amount of an inorganic polymer composed of the repeating unit

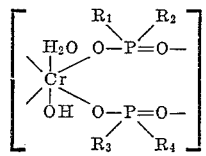

where $R_1$, $R_2$, $R_3$ and $R_4$ are organic groups which may be the same or different, such as alkyl, aryl, aryloxy and alkoxy having up to about 10 carbon atoms. Preferably the R groups are hydrocarbon alkyl or aryl groups having from one to ten carbon atoms such as, for example, methyl, ethyl, propyl, isopropyl, butyl, hexyl, octyl, phenyl, tolyl, xylyl, naphthyl and the like. Other groups represented by $R_1$, $R_2$, $R_3$ and $R_4$ include methoxy, ethoxy, and other alkoxy groups having up to ten carbon atoms, phenyloxy, and the like. The inorganic polymers of hydroxy aquo chromium phosphinates embodied in this invention are characterized by having an intrinsic viscosity, as measured in chloroform solution at 31° C., within the range of about 0.05 to about 5.0. Their structure may also be depicted as

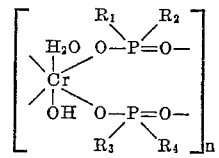

where $n$ is a number of such magnitude that the intrinsic viscosity of the polymer, determined in chloroform solvent at 31° C., is within the range of about 0.05 to about 5.0. The chromium phosphinate polymers and a method of their preparation are described in detail in the copending application of Anthony J. Saraceno, Serial No. 382,924, filed July 15, 1964, now U.S. Patent 3,275,574. Other methods for preparing these inorganic polymers are disclosed in the copending applications of James P. King, Serial No. 479,609 and Serial No. 479,631, and of Keith D. Maguire, Serial No. 479,651, all filed August 13, 1965. The interchangeable terms "vinyl chloride polymer" and "vinyl chloride resin" used herein refer not only to the homopolymers of vinyl chloride but also to the copolymers of vinyl chloride with one or more other ethylenically unsaturated monomers copolymerizable therewith, for example, vinyl fluoride, vinylidene chloride, vinylidene fluoride, vinyl acetate, methyl acrylate, ethyl acrylate, methyl methacrylate, ethyl methacrylate, vinyl methyl ether, ethylene, and many other vinyl esters, acrylate esters, vinyl ethers, alkenes, and the like known in the art of vinyl resin technology, said copolymers containing at least about 50 mole percent of vinyl chloride units.

As stated above, the amount of the chromium phosphinate polymer employed in the compositions of this invention is that required to effectively stabilize the vinyl chloride polymer against the degradative effects of ultraviolet light and heat. Generally, from about 0.01 to about 5% of the inorganic polymer, based on the weight of the vinyl chloride polymer, is used, however, from about 0.1 to about 2 weight percent of the stabilizer is usually adequate and an amount within this range is preferred.

The compositions of the present invention are provided by any suitable manner of intimately blending the ingredients. For instance, the above-described chromium phosphinate polymer, usually in the form of a free flowing powder, can be conveniently mixed in a Banbury mixer or the like with the vinyl chloride resin, also generally obtained in a powder or granular form from the manufacturer, or, alternatively, the materials can be blended on a roll-mill at the fusion temperature of the vinyl chloride resin, e.g. at about 280 to about 400° F., and taken off as sheets which can be cut into easily handled pellets or cubes. The vinyl chloride polymer compositions of this invention can also have incorporated therein the various fillers, pigments and other additives well known in the vinyl resin art. The resin compositions embodied herein may be of the rigid type (nonplasticized) or have one or more plasticizers incorporated therein to provide flexible products.

In the following illustrative examples representative polymer compositions of the invention are subjected to accelerated testing conditions. The examples should not be construed as limitative of the scope of the invention as the compositions are subject to many modifications and variations such as those briefly described above.

EXAMPLES

Films about 18 mils thick of a vinyl chloride polymer ("Geon 222," a vinyl chloride-vinylidene chloride copolymer having about 60% of polymerized vinyl chloride units) containing 1% by weight of a chromium phosphinate polymer additive (described below) were cast in aluminum dishes by evaporating benzene solutions of the resinous compositions. Some films were then exposed for 8 hours to the light of a 125 watt ultraviolet lamp placed at a distance of 8 inches therefrom. The thermal stabilities of the compositions were determined by placing films for measured periods of time in an air oven maintained at 350° F. The films were compared to control films of the vinyl chloride polymer containing no additive and which had been subjected to the same exposures. The specific additives used and the observations of the tests are set forth in Table I below:

TABLE I

| Example No. | Additive | Color of film after exposure to U.V. light | Characteristics of film after exposure in 350° F. oven for— | |
|---|---|---|---|---|
| | | | 20 min. | 25 min. |
| 1 | None | Dark orange | Brown flexible. | Brown brittle. |
| 2 | A | Very pale yellow | Orange flexible. | Do. |
| 3 | B | Essentially colorless | ---do--- | Brown flexible. |
| 4 | C | ---do--- | ---do--- | Do. |

NOTE.—A film is considered to be brittle when cracks are observed when a cooled film is bent 180° without creasing.

Additive A: chromium phosphinate polymer of the formula

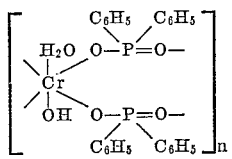

having an intrinsic viscosity of about 0.1 in chloroform at 31° C. ($C_6H_5$ is a phenyl group).

Additive B: polymer of the formula

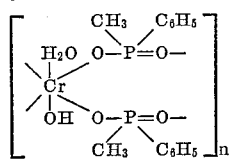

having an intrinsic viscosity of about 0.1.

Additive C: polymer of the formula

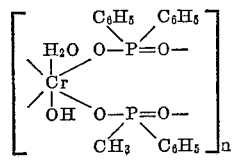

having an intrinsic viscosity of about 0.1.

The foregoing results show that the chromium phosphinate polymers embodied herein impart to vinyl chloride polymers a marked resistance to the deteriorating effects of ultraviolet light and heat.

I claim:
1. A stabilized polymer composition comprising a mixture of a vinyl chloride polymer and a stabilizing amount of a chromium phosphinate polymer composed of the repeating unit

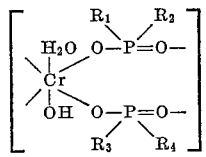

where $R_1$, $R_2$, $R_3$ and $R_4$ are independently selected from the group consisting of alkyl groups having up to 10 carbon atoms, hydrocarbon aryl groups having up to 10 carbon atoms, alkoxy groups having up to 10 carbon atoms, and phenyloxy, said phosphinate polymer characterized by having an intrinsic viscosity, as measured in chloroform solution at 31° C., within the range of about 0.05 to about 5.0.

2. The composition of claim 1 wherein the phosphinate polymer is from about 0.01 to about 5% by weight of the vinyl chloride polymer.

3. The composition of claim 1 wherein the phosphinate polymer is from about 0.1 to about 2% by weight of the vinyl chloride polymer.

4. The composition of claim 1 where, in the phosphinate polymer, $R_1$, $R_2$, $R_3$ and $R_4$ are each phenyl.

5. The composition of claim 1 wherein $R_1$ and $R_3$ are each methyl and $R_2$ and $R_4$ are each phenyl.

6. The composition of claim 1 wherein $R_3$ is methyl and $R_1$, $R_2$ and $R_4$ are each phenyl.

References Cited

UNITED STATES PATENTS 3,245,953  4/1966  Block et al. _____ 260—2
3,255,125  6/1966  Block et al. _____ 260—2
3,275,574  9/1966  A. J. Saraceno _____ 260—2

MURRAY TILLMAN, *Primary Examiner.*

J. L. WHITE, *Assistant Examiner.*